Feb. 25, 1947. E. M. MOREHOUSE Re. 22,846

SUPPORTING CLIP

Original Filed June 8, 1942

Inventor

Eugene M. Morehouse.

By R. S. Berry

Attorney

Reissued Feb. 25, 1947

Re. 22,846

UNITED STATES PATENT OFFICE 22,846

SUPPORTING CLIP

Eugene M. Morehouse, Tujunga, Calif., assignor to Adel Precision Products Corp., a corporation of California Original No. 2,352,856, dated July 4, 1944, Serial No. 446,301, June 8, 1942. Application for reissue July 7, 1944, Serial No. 543,891

19 Claims. (Cl. 248—74)

This invention relates to clips for supporting conduit lines in aircraft.

One of the objects of the present invention is to provide a conduit-supporting clip which may be detachably clamped under tension on the conduit to be supported, either before or after the clip is secured to a support such as a metallic structural part of the aircraft adjacent to which part the conduit extends, whereby the installation of the clips and the removal of conduit lines from the clips are greatly facilitated, it being unnecessary to remove the screw or bolt used to fasten the clip on the support nor the clip in order to open the clip and remove the conduit, nor necessary to rely on the screw or bolt in any manner for effecting the clamping of the clip around the conduit.

Another object of my invention is to provide a conduit-supporting clip such as hereinbefore described wherein a conduit-embracing cushion of compressible insulation material is carried by the metal strap for damping vibrations, electrically insulating the conduit line from the metal strap, also preventing chafing and wear of the strap and conduit.

A further object is to provide a cushioned clip of the character described in which is embodied an electrically conductive bonding strip for discharging static electricity from the conduit line through the strip and metal strap into the metallic frame structure of the airplane.

Heretofore in this art clips have been clamped around the conduit and secured to a support by means of a bolt or screw passed through apertured ends of the strap, thus necessitating a joint operation of clamping the clip on the conduit and mounting the clip on the aircraft framework. In order to remove or replace a conduit supported in this manner it is necessary to remove the screws or bolts and then remove the clips from the support.

With clips embodying the present invention it is possible to securely clamp the clips on the conduit before moving the latter into position to be supported on the aircraft framework, or the clips may be fastened to the framework and then clamped on the conduit, in either case with a saving in time and labor compared to former methods.

Another object of my invention is to provide a clip of the character described in which cooperating fastening elements entirely independent of the fastening used to support the clip are subject to a quick and easy "hooked" engagement with one another and so maintained under tension for effecting a tensioned clamping of the strap and cushion around the conduit, while being subject to being readily sprung apart by a suitable "prying" tool to open the clip and release the conduit.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Figure 1:
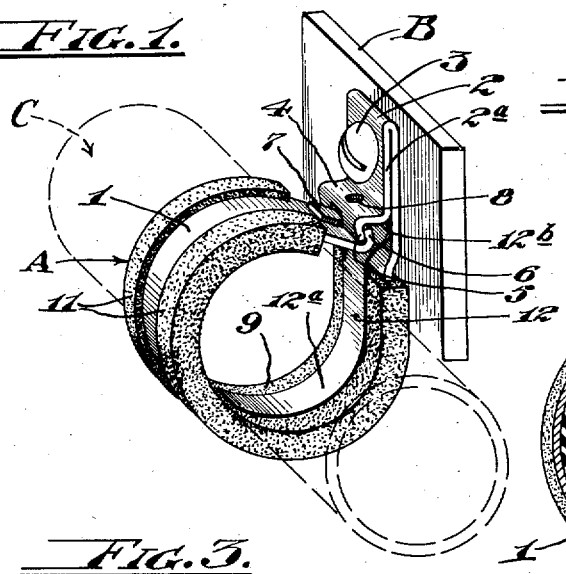
Fig. 1 is a perspective view of a clip embodying my invention as installed.

Referring to the drawing more specifically, A designates a clip embodying my invention, B represents a metal structural part or frame part of an aircraft, and C a conduit supported by the clip.

In accordance with my invention the clip A includes a bendable and resilient metal strap 1 adapted to encircle the conduit C and having an outwardly extended comparatively straight and apertured end portion 2 whereby a screw or like fastening 3 may be employed to secure said end portion to the supporting structure B of the aircraft and thereby support the clip thereon.

An important improvement of my invention is the provision of fastening means apart from the fastening 3, for detachably securing the clip on the conduit in tensioned engagement therewith, either before or after the clip is secured to the airplane structure B.

As here provided the fastening means consists of elements on the ends of the metal strap 1 which are subject to being readily hooked together with a suitable plier-like tool, not shown, and as readily detached with any "prying" instrument, also not shown, for forcing said elements apart, said elements having tensioned engagement when serving to clamp the clip on the conduit.

Figure 2:
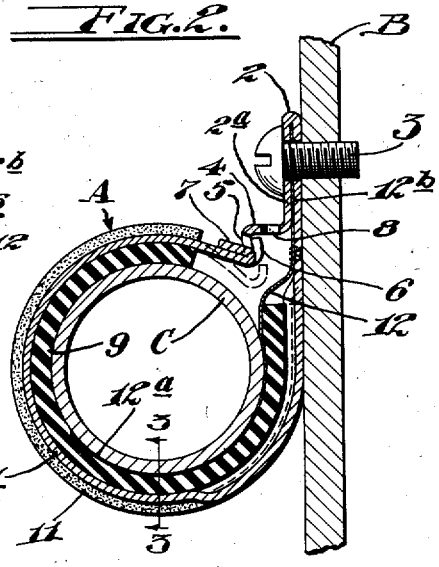
Fig. 2 is a vertical sectional view of the clip as shown in Fig. 1.
Figure 3:
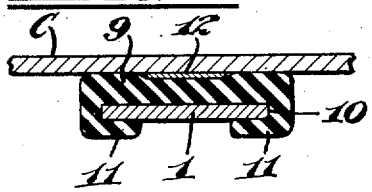
Fig. 3 is a sectional view taken on the line 3—3 of Fig. 2.
Figure 4:
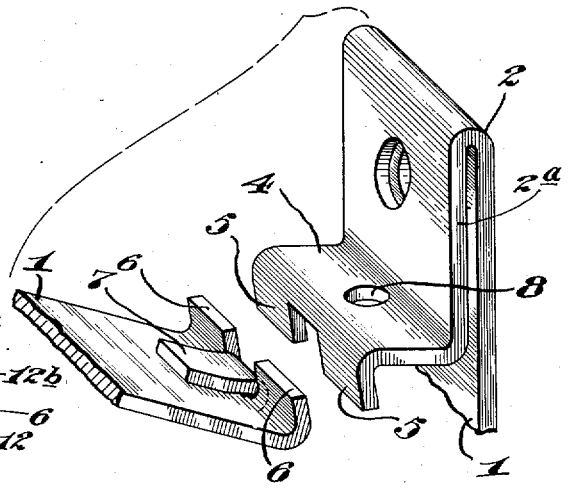
Fig. 4 is a fragmentary perspective of the clip when open.
Figure 5:
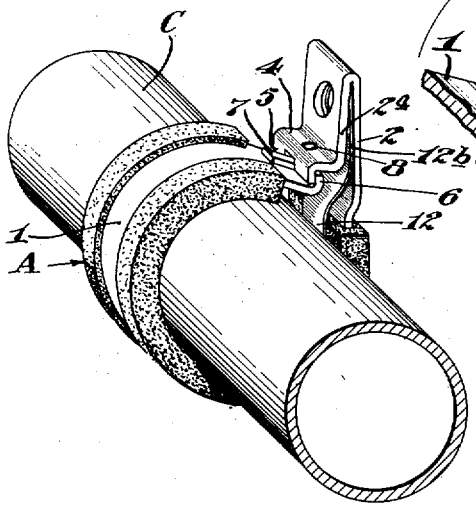
Fig. 5 is a perspective view showing the clip as when clamped around the conduit before the clip is mounted on the framework of the aircraft.

One practicable construction arrangement of these fastening elements consists in bending the end portion 2 back on itself as at 2*a* with an aperture in said bent back portion to coincide with aperture in the portion 2 as best shown in Fig. 4. The inner end of this bent back portion is extended outwardly substantially right angularly to form a flange 4 on the outer end of which are formed laterally spaced and inwardly extending fastening elements or lugs 5. The lugs 5 are bent to form an acute angle with flange 4 to provide a hook action and are adapted to be engaged by similarly formed lugs 6 on the other end of the strap 1, the lugs 6 being hooked behind the lug 5 as shown in Figs. 1 and 2 when the clip is clamped on the conduit. A portion 7 of the strap is bent back between the lugs 6 to lie upon the outer face of the strap as an abutment or gripping piece for the plier-like tool used to bring the lugs 5 and 6 into hooked or interlocked engagement with one another. The portion 7 also serves as a locking lug between the lugs 5 to prevent the lugs 6 from sliding or slipping sidewise from contact with lugs 5.

The flange 4 may be provided with an opening 8 to facilitate the gripping of said extension by the aforesaid tool during the operation of hooking the lugs 5 and 6 together.

It will be observed with reference to Fig. 4 that when the clip is open the conduit may be inserted therein after which by means of a tool such as aforementioned or otherwise, the ends of the strap 1 are forced into position to cause the lugs 6 to hook behind the lugs 5 as shown in Fig. 2, thereby clamping the clip on the conduit. The strap 1 is so tensioned and the lugs 5 and 6 so disposed that they may be fastened by springing the end carrying the lugs 6 under the flange 4 as indicated by the dotted lines in Fig. 2, the lugs 6 being forced by the spring action of the strap 1 into tensioned contact with the lugs 5.

It will be understood that the clip may be clamped in this manner on the conduit before or after it is secured to the structure B, inasmuch as the lugs 5 and 6 are spaced well inwardly from said screw and so arranged that said lugs and the screw may be independently operated without interference.

Depression of the end of the strap carrying the lugs 6, as indicated by the dotted lines in Fig. 2, will permit of disengaging or "unhooking" said lug to open the clip, as shown in Fig. 4, thereby releasing the conduit.

It is preferable to employ a cushion strip 9 or resilient material for damping vibrations in the conduit lines, preventing abrasion of the line and strap and also electrically insulating the strap from the conduit line. As here shown, this cushion is provided with a T-slot 10 to accommodate the strap 1 and which forms flanges 11 for embracing the strap and holding the cushion thereon. This cushion is under compression when the clip is clamped on the conduit, thereby increasing the tensioned contact of the interlocked lugs 5 and 6.

The clip of my invention further includes a thin, flexible metal bonding strip 12, a portion **12*a* of which overlies a large part of the conduit engaging face of the cushion while a portion 12*b* is clamped between the bent back portion 2*a* and end portion 2 and thus permanently bonded to the strap 1** as best shown in Fig. 2. In this connection it should be noted that the bonding strip may be welded or otherwise fixed in bonding connection with the strap.

The bent back portion **2*a* and the flange portion 4 thereon afford a resilient action for the fastening lugs 5 to insure a tensioned yet secure interlocking of lugs 5 and 6** with one another and facilitate the operation of hooking and unhooking said lugs.

It is important to note that the lugs 5 are disposed well below the apertures and screw 3 in the end portions 2 and **2*a***, while also being well outwardly spaced from said end portions, thereby making it possible to have ready access to both sets of lugs for securing and releasing them.

It should be noted that the clip of my invention may be used to advantage as a harness for supporting a group of wires.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a supporting clip, a resilient metal strap having a portion for supportingly embracing a conduit or a group of wires, separate end portions forming parts of said strap, means embodied in one of said end portions affording the affixation thereof to a support independent of the other end portion, and hook elements arranged on said end portions so that when initially hooked together they will have tensioned contact with one another while the strap embraces the conduit or wires before or after said end portion is secured to the support, said affixed end portion being doubled back on itself and having certain of the hook elements formed on the inner extremity of said doubled back portion.

2. In a supporting clip, a resilient metal strap having a portion for supportingly embracing a conduit or a group of wires, separate end portions forming parts of said strap, one of said end portions being bent back on itself and provided with aligned apertures for a fastening member to secure said one end portion to a support independent of the other end portion; an outwardly extended inner end on said bent back portion, spaced hooks on said outwardly extended inner end; and spaced hooks on the other end of said strap which when initially engaged with the first named hooks provide a tensioned clamping of the strap on said conduit or group of wires.

3. In a supporting clip, a resilient metal strap having a portion for supportingly embracing a conduit or a group of wires, separate end portions forming parts of said strap, one of said end portions being bent back on itself and provided with aligned apertures for a fastening member to secure said one end portion to a support independent of the other end portion; an outwardly extended inner end on said bent back portion, spaced hooks on said outwardly extended inner end, spaced hooks on the other end of said strap which when initially engaged with the first named hooks provide a tensioned clamping of the strap on said conduit or group of wires; and a lug on said other end adapted to be disposed between said hooks when the latter are hooked together, to prevent lateral displacement thereof.

4. In a supporting clip, a resilient metal strap having a portion for supportingly embracing a conduit or a group of wires, separate end portions forming parts of said strap, one of said end portions being bent back on itself and provided with aligned apertures for a fastening member to secure said one end portion to a support independent of the other end portion; an outwardly extended inner end on said bent back portion, spaced hooks on said outwardly extended inner end, spaced hooks on the other end of said strap which when initially engaged with the first named hooks provide a tensioned clamping of the strap on said conduit or group of wires; and a lug on said other end adapted to be disposed between said hooks when the latter are hooked together to prevent lateral displacement thereof, said outwardly extended inner end having an opening therein affording a grip for a tool which is also engaged with said lug to effect the engagement of said hooks with one another.

5. In a supporting clip, a resilient metal strap having a portion for supportingly embracing a conduit or a group of wires, separate end portions forming parts of said strap, means embodied in one of said end portions affording the affixation thereof to a support independent of the other end portion, and hook elements arranged on said end portions so that when initially hooked together they will have tensioned contact with one another to secure the clip to the conduit or wires before or after said end portion is secured to the support; and a conduit-embracing cushion of resilient material on said conduit embracing portion of said strap arranged to be compressed when said hook elements are initially hooked together.

6. In a supporting clip, a resilient metal strap having a generally circular portion for supportingly embracing a conduit or group of wires, and separate end portions forming parts of said strap, one of said end portions having a back run which is a substantially tangential continuation of the circular part of the strap, said run terminating in a part which is forwardly bent over upon itself to form a front run, there being an aperture through the doubled over metal to receive means for fastening the clip to a support, said front run having its terminal portion directed forwardly a short distance and then ending in a forwardly positioned hook having a downwardly directed terminal portion, said strap having a free opposite end portion carrying a hook with an open side directed away from the conduit embracing part of the strap, and positioned to be moved upwardly and forwardly into an interlocking relation to the aforesaid downwardly directed portion at the opposite end of the strap.

7. In a supporting clip, a resilient metal strap having a generally circular portion for supportingly embracing a conduit or group of wires and separate end portions forming parts of said strap, one of said end portions having a back run which is a substantially tangential continuation of the circular part of the strap, said run terminating in a part which is forwardly bent over upon itself to form a front run, there being an aperture through the doubled over metal to receive means for fastening the clip to a support, said front run having its terminal portion directed forwardly a short distance and then ending in a plurality of lugs which are backwardly inclined, the opposite end portion of the strap having formed upon it a hook positionable back of said lugs to maintain the clip in conduit embracing position, the last recited end portion of said strap carrying also a locking lug which occupies the space between the first recited lugs when said hook is in its operative position.

8. In a supporting clip for a conduit or wires, a resilient metal strap having a generally circular conduit or wire embracing portion and separate portions extending outwardly from the circular portions in normally spaced relation to one another and adapted to be hooked together to close the clip and clamp it around the conduit or wires, said strap having means therein affording the application thereto of a fastening for securing the clip to a support with an outer surface of one of said outwardly extending portions abutting the support, and means embodied in the free ends of said outwardly extending portions for releasably hooking them together to close the clip and clamp it around the conduits or wires before securing the clip to the support, including a hook formed by bending inwardly toward the circular portion, the free end of the strap adjoining said support-abutting portion; the free end of the other outwardly extending portion of the strap arranged so that when pressed directly inwardly in a direction normal to the axis of the conduit or wires in the clip and against the outer face of said hook, it will be moved downwardly on said face and under the bill of the hook and then snap upwardly into hooked engagement with said hook.

9. In a supporting clip for a conduit or wires, a resilient metal strap having a generally circular conduit or wire embracing portion and separate portions extending outwardly from the circular portions in normally spaced relation to one another and adapted to be hooked together to close the clip and clamp it around the conduit or wires, said strap having means therein affording the application thereto of a fastening for securing the clip to a support with an outer surface of one of said outwardly extending portions abutting the support, and means embodied in the free ends of said outwardly extending portions for releasably hooking them together to close the clip and clamp it around the conduits or wires before securing the clip to the support, including a hook formed by bending inwardly toward the circular portion, the free end of the strap adjoining said support-abutting portion; the free end of the other outwardly extending portion of the strap arranged so that when pressed directly inwardly in a direction normal to the axis of the conduit or wires in the clip and against the outer face of said hook, it will be moved downwardly on said face and under the bill of the hook and then snap upwardly into hooked engagement with said hook, and an elastic cushion mounted on said circular portion as a conduit or wire embracing seat operating to resiliently urge said free ends into tensioned and hooked interengagement when the clip is clamped around the conduit or wires.

10. In a supporting clip for a conduit or wires, a resilient metal strap having a generally circular conduit or wire embracing portion and separate portions extending outwardly from the circular portions in normally spaced relation to one another and adapted to be hooked together to close the clip and clamp it around the conduit or wires, at least one of said separate portions being provided with means for receiving a fastening for securing the clip to a support, said outwardly extending portions embodying inter-engageable means at their free ends for releasably hooking them together to retain the clip around the conduit or wires, said inter-engageable means including a hook formed by the inward bending of the end of said one of said outwardly extending portions toward the circular portion of said strap, the free end of the other outwardly extending portion of the strap being constructed and arranged to snap into engagement with said hook upon pressing the same against the outer face of the hook and directly inwardly in a direction normal to the axis of the conduit or wires retained by the clip.

11. A fastener device comprising a band bendable into the form of a closed loop and adapted to receive and hold an article such as wire, the opposite terminal ends of said band being formed with cooperating interlocking hooked portions to resist separation of the ends in an expandible direction outwardly from the center of the loop, and means on the interlocking hooked portions for preventing lateral shifting of the interlocked ends laterally in the plane of the interlocked ends.

12. A fastener device comprising a resilient member bendable into the form of a closed loop and adapted to receive and hold an article such as wire, the opposite terminal ends of said member being formed with reversely hooked portions adapted to be interlocked together to resist separation of the ends in an expandible direction outwardly from the center of the loop, and means in said hooked portions for preventing lateral shifting of the interlocked ends laterally in a plane of the interlocked ends.

13. A fastener device comprising a band bendable into the form of a closed loop and adapted to receive and hold an article such as wire, the opposite terminal ends of said band being formed with cooperating interlocking hooked portions to resist separation of the ends in an expandible direction outwardly from the center of the loop, one of said hooked portions being formed with a tongue and the other of said hooked portions being formed with a recess to receive said tongue for locking said ends together against relative shifting movement laterally.

14. A fastener device comprising a resilient band adapted to be connected at its opposite ends to form a loop to receive and hold a plurality of conductors, one of said band ends being formed with an inwardly hooked terminal portion and the other band end formed with an outwardly hooked terminal portion, said hooked terminal portions being formed with interlocking tongue and slot means preventing shifting of said ends laterally when in interlocked engagement.

15. A fastener device comprising a resilient band adapted to be connected at its opposite ends to form a loop to receive and hold a plurality of conductors, one of said band ends being formed with an inwardly hooked terminal portion and the other band end formed with an outwardly hooked terminal portion, said hooked terminal portions being formed with interlocking means preventing shifting of said ends laterally when in interlocked engagement and a strip of soft elastic material positioned along the inner face of said band, and means for securing said elastic material to said bands adjacent the ends and inwardly of the hooked ends thereof.

16. A fastener device comprising a band bendable into the form of a closed loop and adapted to receive and hold an article such as wire, the opposite terminal ends of said band being formed with interlocking hooked ends, said complementary hooked ends provided with inter-engaging means operative as a result of the interlocking of said hooked ends for preventing relative sidewise movement of the interlocked hooked ends.

17. A fastener device comprising a resilient band adapted to be connected at its opposite ends to form a loop to receive and hold a plurality of conductors, one of said band ends being formed with an inwardly hooked centrally slotted terminal portion and the other band end formed with an outwardly directed hooked end, and an angularly disposed bead adapted to be positioned in the slot of the inwardly hooked end when the hooked ends are interlocked.

18. A fastener device comprising a resilient band adapted to be connected at its opposite ends to form a loop to receive and hold a plurality of conductors, one of said band ends being formed with an inwardly hooked centrally slotted terminal portion and the other band end formed with an outwardly directed hooked T-shaped end, the stem of the T being adapted to be positioned within the slot of the inwardly hooked end when the hooked ends are interlocked.

19. A fastener device comprising a resilient band adapted to be connected at its opposite ends to form a loop to receive and hold a plurality of conductors, one of said band ends being formed with an inwardly hooked laterally spaced terminal portion and the other band end being formed with an outwardly hooked end, and an angularly disposed bead adapted to be positioned between said spaced hooked terminal portions when the ends of said band are interlocked together.

EUGENE M. MOREHOUSE.

REFERENCES CITED

The following references are of record in the file of this patent:

UNITED STATES PATENTS

| Number | Name | Date |
|---|---|---|
| 888,349 | Ogden | May 19, 1908 |
| 2,215,283 | Adler | Sept. 17, 1940 |
| 1,288,515 | Coffin | Dec. 24, 1918 |